United States Patent
Graves et al.

(10) Patent No.: US 7,430,671 B2
(45) Date of Patent: Sep. 30, 2008

(54) SYSTEMS AND METHODS FOR PRESERVING CONFIDENTIALITY OF SENSITIVE INFORMATION IN A POINT-OF-CARE COMMUNICATIONS ENVIRONMENT

(75) Inventors: Alan Frank Graves, Kanata (CA); Jeffrey Fitchett, Kanata (CA); John Watkins, Ottawa (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 643 days.

(21) Appl. No.: 10/813,358

(22) Filed: Mar. 31, 2004

(65) Prior Publication Data

US 2005/0223222 A1    Oct. 6, 2005

(51) Int. Cl.
*G06F 12/14*    (2006.01)
*H04L 9/00*    (2006.01)

(52) U.S. Cl. .................... 713/193; 713/165; 713/167

(58) Field of Classification Search .................... None
See application file for complete search history.

(56) References Cited

U.S. PATENT DOCUMENTS

| | | | |
|---|---|---|---|
| 5,291,399 A | 3/1994 | Chaco | |
| 5,465,082 A | 11/1995 | Chaco | |
| 5,594,786 A | 1/1997 | Chaco et al. | |
| 5,677,952 A * | 10/1997 | Blakley et al. | 713/189 |
| 5,689,229 A | 11/1997 | Chaco et al. | |
| 5,818,939 A * | 10/1998 | Davis | 713/192 |
| 5,822,544 A | 10/1998 | Chaco et al. | |
| 5,867,821 A | 2/1999 | Ballantyne et al. | |
| 5,933,136 A | 8/1999 | Brown | |
| 6,009,333 A | 12/1999 | Chaco | |
| 6,259,355 B1 | 7/2001 | Chaco et al. | |
| RE37,531 E | 1/2002 | Chaco et al. | |
| 6,344,794 B1 | 2/2002 | Ulrich et al. | |
| 6,462,656 B2 | 10/2002 | Ulrich et al. | |
| 6,539,393 B1 | 3/2003 | Kabala | |
| 6,825,763 B2 | 11/2004 | Ulrich et al. | |
| 6,876,303 B2 | 4/2005 | Reeder et al. | |
| 6,958,706 B2 | 10/2005 | Chaco et al. | |
| 6,963,979 B2 * | 11/2005 | Fairclough et al. | 713/189 |

(Continued)

OTHER PUBLICATIONS

Microsoft TechNet: (Microsoft TechnNet "Data Protection Implementing the Encrypting File System in Windows 2000" posted in "Windows 2000 File Systems Tutorials", in particular: "Step-by-Step Guide to Encrypting File System (EFS)" article on May 2002.*

(Continued)

*Primary Examiner*—Kambiz Zand
*Assistant Examiner*—Peter Poltorak

(57) ABSTRACT

A data processing apparatus comprises a memory store; a data bus connected to the memory store, the data bus being adapted for transporting data to and from the memory store; a processing entity operative to release read and write commands towards the memory store, the write command being accompanied by first data intended to be written to the memory store; and an encryption module communicatively coupled to the processing entity and to the data bus. Upon the processing entity releasing a write command accompanied by said first data, the encryption module encrypts, in accordance with an encryption key, said first data and send an encrypted version of said first data onto the data bus for writing into the memory store. The reverse operation is performed upon the processing entity releasing a read command.

29 Claims, 9 Drawing Sheets

U.S. PATENT DOCUMENTS

| | | | |
|---|---|---|---|
| 6,972,683 | B2 | 12/2005 | Lestienne et al. |
| 6,993,661 | B1* | 1/2006 | Garfinkel .................... 713/193 |
| 7,038,588 | B2 | 5/2006 | Boone et al. |
| 7,042,337 | B2 | 5/2006 | Borders et al. |
| 7,080,061 | B2 | 7/2006 | Kabala |
| 7,120,139 | B1 | 10/2006 | Kung et al. |
| 7,154,397 | B2 | 12/2006 | Zerhusen et al. |
| 7,162,731 | B2 | 1/2007 | Reidhead et al. |
| 2002/0026105 | A1* | 2/2002 | Drazen ...................... 600/300 |
| 2002/0032582 | A1 | 3/2002 | Feeney, Jr. et al. |
| 2002/0044059 | A1 | 4/2002 | Reeder et al. |
| 2002/0111831 | A1 | 8/2002 | Harada |
| 2002/0183979 | A1 | 12/2002 | Wildman |
| 2002/0188466 | A1 | 12/2002 | Barrette et al. |
| 2003/0014283 | A1 | 1/2003 | Iwano et al. |
| 2003/0037247 | A1* | 2/2003 | Obara et al. ................ 713/193 |
| 2003/0065626 | A1 | 4/2003 | Allen |
| 2003/0115447 | A1* | 6/2003 | Pham et al. ................. 713/153 |
| 2003/0132845 | A1 | 7/2003 | McDaniel, III |
| 2003/0165128 | A1 | 9/2003 | Sisodia et al. |
| 2003/0179223 | A1* | 9/2003 | Ying et al. ................. 345/702 |
| 2003/0208382 | A1* | 11/2003 | Westfall ....................... 705/3 |
| 2004/0004968 | A1 | 1/2004 | Nassar |
| 2004/0068421 | A1 | 4/2004 | Darpeau et al. |
| 2004/0193449 | A1 | 9/2004 | Wildman et al. |
| 2004/0260577 | A1 | 12/2004 | Dahlin et al. |
| 2005/0035862 | A1 | 2/2005 | Wildman et al. |
| 2005/0063420 | A1 | 3/2005 | Graves |
| 2005/0066061 | A1 | 3/2005 | Graves et al. |
| 2005/0086079 | A1 | 4/2005 | Graves et al. |
| 2005/0151641 | A1 | 7/2005 | Ulrich et al. |
| 2005/0168341 | A1 | 8/2005 | Reeder et al. |
| 2005/0246553 | A1* | 11/2005 | Nakamura et al. .......... 713/193 |
| 2005/0272275 | A1 | 12/2005 | Graves |
| 2006/0282459 | A1 | 12/2006 | Kabala |

OTHER PUBLICATIONS

Jeff Schmidt, "Microsoft Windows 2000 Security Handbook", ISBN: 0789719991, Aug. 2000, p. 147, 268, 210, 277, 318, 320-322, 470-471 and 560.*

Bruce Schneier, "Applied Cryptography, Protocols, Algorithms and Source Code in C", 2nd edition, 1996 ISBN: 0471128457, p. 223-225.*

NetworkWorld: Chris Lawler, "Taking a look at the basics of ASICs", Dec. 1998.*

Ron White, "How Computer Work", 7th edition, ISBN: 0789730332, Oct. 2003, p. 16-17, 28-29.*

Clinical Decision Support, Finding The Right Path; by Jane Metzge, Donna Stablein and Fran Turisco; First Consulting Group; Sep. 2002.

Computerized Physician Order Entry, A Look at the Vendor Marketplace and Getting Started; by Jane Metzger and Fran Turisco; First Consulting Group; Dec. 2001.

Leapfrog Patient Safety Standards; The Potential Benefits of Universal Adoption, by J.D. Birkmeyer, The Leapfrog Group, Nov. 2000.

Computerized Physician Order Entry; Costs, Benefits and Challenges; A case study approach, by First Consulting Group for Advancing Health in America and the Federation of America Hospitals, Jan. 2003.

A Primer on Physician Order Entry; First Consulting Group for the California Healthcare Foundation, Oakland, CA, Sep. 2000.

Cisco Long-Reach Ethernet Solution; Product Catalog, Dec. 2003; (pp. 1-6).

Cisco Long-Reach Ethernet Frequently Asked Questions; downloaded from www.cisco.com as early as Feb. 13, 2004.

Cisco LRE/VDSL (Long-Reach Ethernet/Very-High-Data-Rate DSL); downloaded from www.cisco.com as early as Feb. 13, 2004.

Cisco LRE CPE Hardware Installation Guide, totaling 106 pages, text part No. 78-11469-04, May 2003.

Physician Adoption of Technology Linked to Providing Benefits; Technology and Quality; by Barry P. Chaiken, MD, MPH; Reprinted with permission from the Journal of Quality Health Care, vol. 1, Issue No. 2; Apr./Jun. 2002.

Eric Maiwald, Network Security A Beginner's Guide, Feb. 21, 2001, Chapter 9, 35 pages, The McGraw-Hill Companies.

* cited by examiner

SYSTEMS AND METHODS FOR PRESERVING CONFIDENTIALITY OF SENSITIVE INFORMATION IN A POINT-OF-CARE COMMUNICATIONS ENVIRONMENT

CROSS-REFERENCES TO RELATED APPLICATION

The present invention is related in subject matter to the co-pending U.S. patent application entitled "INTEGRATED AND SECURE ARCHITECTURE FOR DELIVERY OF COMMUNICATIONS SERVICES IN A HOSPITAL" to Graves et al., filed on the same day as the present application and incorporated by reference herein in its entirety.

FIELD OF THE INVENTION

The present invention relates generally to systems and methods for preserving the confidentiality of sensitive healthcare information (i.e., clinical data) accessible via end user devices located at the point of care.

BACKGROUND OF THE INVENTION

The ability for a hospital information network to interact with clinicians while they are located at the point of care (POC), e.g., at a patient's bedside, is recognized as having the potential to dramatically reduce the incidence of certain medical complications. Specifically, studies estimate that significant benefits are likely to arise through the provision of "computerized physician order entry" (CPOE), which consists of allowing clinicians (e.g., doctors, nurses, orderlies) to place orders (e.g., prescription, blood test, clean towel, etc.) combined with the deployment of real-time Decision Information and Support Tools (DIST) to alert the clinician to potential issues, delivered to the clinician via a bedside location in the vicinity of the patient being treated. This simple yet elusive paradigm, dubbed "CPOE at the POC", has the potential effect of reducing human error due to temporary memory loss and mistakes in transcription by clinicians or clerical staff, since the terminal is at the patient-clinician interaction site and human memory or scribbled notes are not needed to retain the data until entry during a subsequent data entry session at a somewhat remote location. In addition, when coupled with real-time decision information support tools (DIST), CPOE provides physicians with an additional level of assurance that their diagnosis or treatment plan is within generally accepted parameters.

For background reading on the CPOE at the POC paradigm and its predicted impact, the reader is referred to the following references, incorporated by reference herein:

Clinical Decision Support—Finding the Right Path, by J. Metzger, D. Stablein and F. Turisco, First Consulting Group, September 2002

Computerized Physician Order Entry: Costs, Benefits and Challenges—A case Study Approach, by First Consulting Group for Advancing Health in America and the Federation of American Hospitals, January 2003

Leapfrog Patient Safety Standards—The Potential Benefits of Universal Adoption, by J. D. Birkmeyer, The Leapfrog Group, November 2000

Computerized Physician Order Entry: A Look at the Vendor Marketplace and Getting Started, by J. Metzger, F. Turisco, First Consulting Group, December 2001

A Primer on Physician Order Entry, by First Consulting Group for the California Healthcare Foundation, Oakland, Calif., September 2000

One effect of implementing CPOE at the POC is a proliferation of access points to the hospital information system (HIS). Whereas in a conventional hospital environment, access to the HIS may be gained through terminals strategically located in a limited number of relatively secure locations at ward nursing stations, ward corridors, operating rooms and examination rooms, under the "CPOE at the POC" paradigm there may be hundreds of access points to the HIS since access is to be provided at the point of clinician-patient interaction. It becomes quickly apparent why a major concern with implementing CPOE at the POC lies is in the area of data security and privacy. More specifically, a valid concern is raised regarding the potential availability of sensitive clinical information at a variety of access points, not all of which can be guarded simultaneously or with the same effectiveness. Not only is it apparent that the physical theft of any device containing confidential medical information may inconvenience or harm the patient but, in addition to losing a physical asset in the device itself, the healthcare facility may be faced with sanctions and/or lawsuits, should the contents of the stolen records be made public or if there are reasonable grounds to believe that they will be made public. Moreover, the potential for theft of physical devices and sensitive data, along with the consequences such theft entails, becomes even greater in the mobile version of CPOE, known as MPOE, where clinicians communicate with the HIS through portable wireless devices, whose whereabouts are clearly more difficult to track on a constant basis.

Thus, there remains a need in the healthcare industry for protecting the confidential nature of clinical data in a CPOE or MPOE environment, where there is a risk of theft, or where there is a risk that the terminal will be temporarily or permanently moved outside the control of the hospital IT system or staff, whether outside or inside the hospital.

SUMMARY OF THE INVENTION

According to a first broad aspect, the present invention seeks to provide a data processing apparatus. The data processing apparatus comprises a memory store; a data bus connected to the memory store, the data bus being adapted for transporting data to and from the memory store; a processing entity operative to release read and write commands towards the memory store, the write command being accompanied by first data intended to be written to the memory store; and an encryption module communicatively coupled to the processing entity and to the data bus. Upon the processing entity releasing a write command accompanied by said first data, the encryption module encrypts, in accordance with an encryption key, said first data and send an encrypted version of said first data onto the data bus for writing into the memory store. Upon the processing entity releasing a read command, the encryption module decrypts, in accordance with a decryption key, an encrypted version of second data received from the memory store via the data bus and provide said second data to the processing entity.

According to a second broad aspect, the present invention seeks to provide an end user device for communication with a server. The end user device comprises a control entity operative to support a session with the server for an authenticated user and a memory store operative to store sensitive information during the session. The control entity is further operative to (i) determine whether confidentiality of the sensitive information stored in the memory store is to be preserved and (ii) responsive to determining that confidentiality of the sensitive information stored in the memory store is to be preserved, taking an action to preserve confidentiality of the sensitive information stored in the memory store.

According to a third broad aspect, the present invention seeks to provide a method. The method comprises supporting a session with the server for an authenticated user; storing sensitive information during the session; determining whether confidentiality of the sensitive information stored in the memory store is to be preserved; and, responsive to determining that confidentiality of the sensitive information stored in the memory store is to be preserved, taking an action to preserve confidentiality of the sensitive information stored in the memory store.

According to a fourth broad aspect, the present invention seeks to provide a method. The method comprises establishing a healthcare session with an end user device servicing an authenticated user; providing sensitive healthcare information to the end user device for storage thereon during the healthcare session; detecting existence of a requirement to preserve confidentiality of the sensitive healthcare information; and, responsive to the detecting, sending a message to the end user device instrumental in causing the end user device to preserve the confidentiality of the sensitive healthcare information.

According to a fifth broad aspect, the present invention seeks to provide a network attachment process for an end user device. The process comprises receiving operational characteristics of the end user device; selecting operating code for use by the end user device on the basis of the operational characteristics of the end user device; and downloading the selected operating system code onto the end user device.

According to a sixth broad aspect, the present invention seeks to provide a host entity for use in a network. The host entity comprises a terminal identification module adapted to receive operational characteristics of an end user device and an operating system server adapted to select operating code for use by the end user device on the basis of the operational characteristics of the end user device. The operating system server is further adapted to transmit the selected operating system code to the end user device.

According to a seventh broad aspect, the present invention seeks to provide a network attachment process for an end user device. The process comprises transmitting first operating system code to the end user device to enable the end user device to transmit a message requesting authentication of a user; and, responsive to successful authentication of the user, transmitting second operating system code to enable continued use of the end user device by the user.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

With reference to FIGS. 1, 2A, 2B and 3A, there is shown an architecture for delivering healthcare communications services (e.g., CPOE) to the point of care (POC) for healthcare users (e.g., physicians, nurses, orderlies, etc.). The architecture comprises a host processing entity 100 (hereinafter "host"), which consists of one or multiple instantiations, based on size, capacity, physical partitioning, and other factors, disposed between a core hospital network 114 and a plurality of end user devices 104. Examples of a POC where a fixed-wire end user device 104 may be employed include a patient bedside or a ward, an operating theater and an examination room. On the other hand, the use of a wireless end user device 104 allows the healthcare user a greater deal of flexibility, whereby the actual location of the POC will be governed by movement of the healthcare user. Both scenarios, as well as variations and combinations thereof, are within the scope of the present invention.

Figure 1:
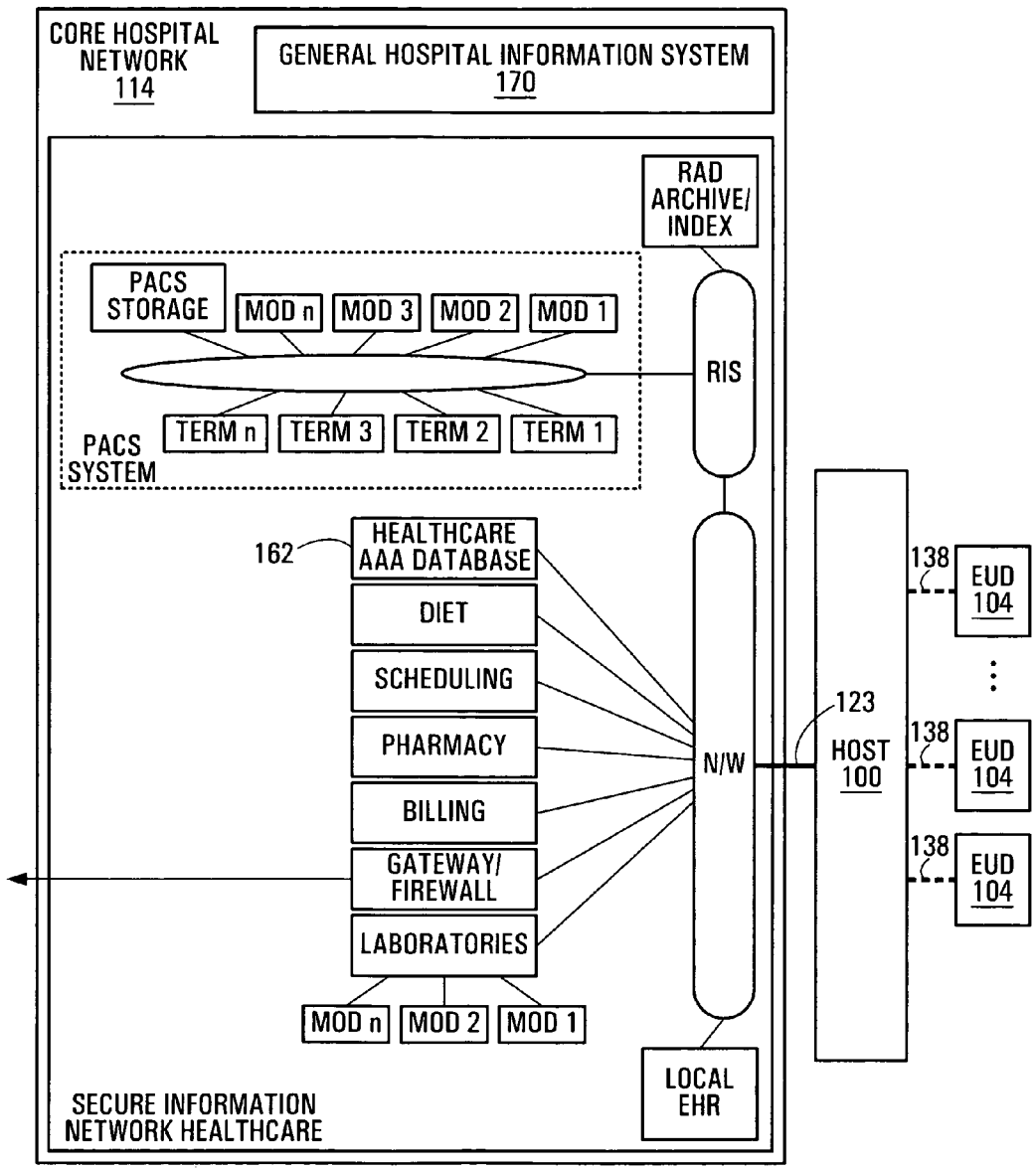
FIG. 1 shows an architecture for delivering healthcare communications services to the point of care, including a detailed block diagram of a core hospital network.

With specific reference to FIG. 1, the core hospital network 114 comprises a secure healthcare information network (SHIN) 160, as well as a general hospital information system 170. These two networks may be physically separate or the secure hospital information network may be protected from the general hospital information system 170 by a degree of separation involving firewalls, additional security, gateway functions, dedicated VPN's and the like. The secure healthcare information network 160 is connected to the host 100 via a communication link 123. The secure healthcare information network 160 interconnects various hospital entities, such as radiology (connected to a PACS system), diet, scheduling, pharmacy, cardiology, billing, laboratories, local electronic health records, etc. The secure healthcare information network 160 also maintains a healthcare AAA database 162, which contains information allowing healthcare users to be authenticated. In an embodiment, the healthcare AAA database 162 comprises a collection of healthcare user identities and securely held corroborating evidence, along with an associated access profile for each healthcare user, which will include a dynamic patient access list based on the hospital's admissions database together with a specific mapping of who has what accessible data, based upon professional qualifications, status and allocation to patient treatment teams, which itself may be dynamic, especially for shift workers such as nurses. The secure healthcare information network 160 may further interconnect to other hospital information systems via a firewall.

The CPOE-at-the-POC architecture of FIGS. 1, 2A, 2B and 3 provides authenticated healthcare users with real-time bidirectional access to a suite of clinical tools and databases which can assist their productivity and accuracy while interacting with the patient and making decisions about the patient's condition and treatment. This is achieved by providing access to a suite of clinical services and applications in the host 100 which can interact with the secure hospital information network 160 under the direction of authenticated users in order to permit access to records of the patient, including historical records, results from recent/ongoing tests, previous/ongoing treatments and drug regimens, etc., while also allowing the authenticated healthcare user to capture his/her decision on patient condition, diagnosis, treatment orders and drug orders to the pharmacy, etc., in a direct-entry process proven to reduce the incidence of clinical errors. This approach allows the use of real-time Decision Information Support Tools (DIST) which can reside in the hospital core network 114 or which might reside as a service on an application server in the host 100. Such tools provide validation of clinician orders, for instance by checking medical records for other drug prescriptions that are in effect which might lead to a drug interaction with the newly prescribed drug and cause an adverse drug reaction (ADR). Naturally, the healthcare user is first authenticated to be who he/she claims to be, and then the healthcare user is admitted on a limited basis to the host 100 and the core hospital network 114, based upon his/her access profile. The healthcare user can then access the necessary clinical tools to access patient data for those patients they are authorized to access to a level of read, read/write or write access as allocated from an AAA server located in the hospital core network 114.

The host 100 communicates with each end user device 104 via a respective communications link 138, which may be either an entirely fixed-wire link (FIG. 2A) or a partly fixed-wire and partly wireless link (FIG. 2B) or even a completely wireless link, depending on the nature of the end user device 104 and the intermediate access transmission system. The communications link 138 may be implemented as a physical end-to-end link or it may be in series with a virtual encrypted link over an interposed general purpose network. Suitable non-limiting examples of fixed-wire cabling for the communications link 138 include coaxial cable, as well as twisted pair (e.g., access-side PBX, Cat 2-3 or Cat 5). In another embodiment, the host 100 is connected via Ethernet connections (e.g., native Ethernet or Ethernet over DSL) to wireless base stations or access points to provide wireless LAN service to areas (such as examination rooms) throughout the hospital.

Figure 2A:
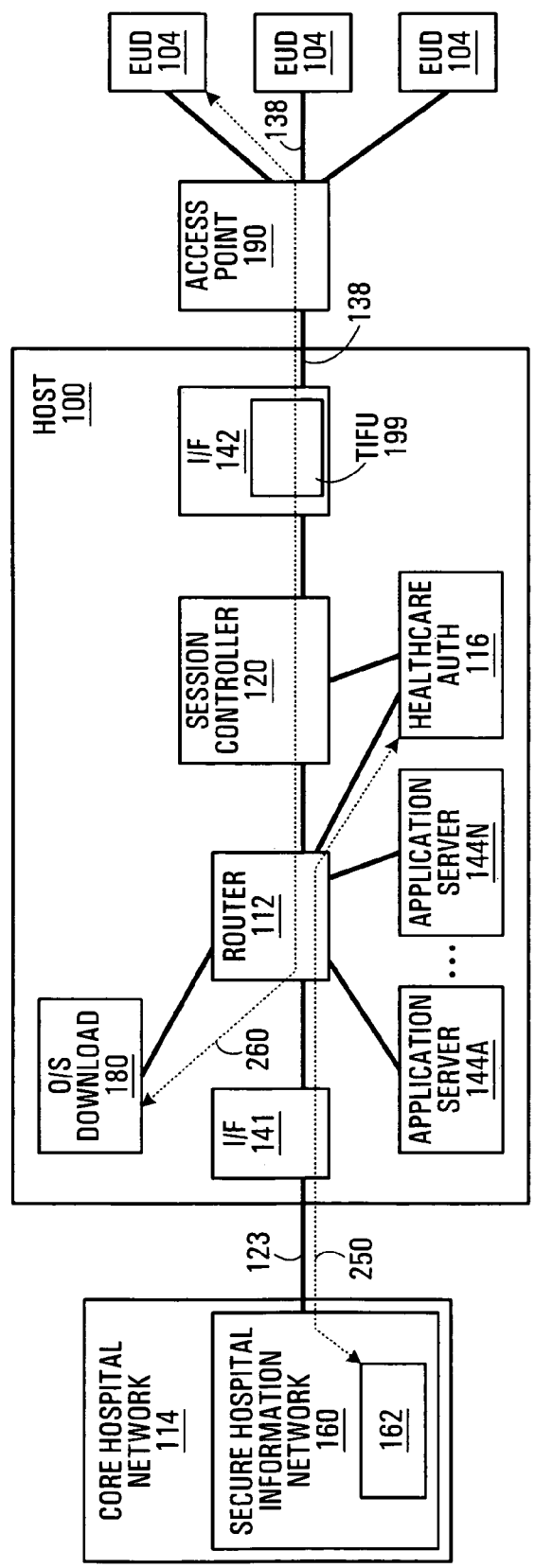
FIGS. 2A and 2B show two embodiments of a host for use in the architecture of FIG. 1.

With specific reference to FIG. 2A, there is shown a first variant of the host 100, which is used to communicate over fixed-wire links 138 with fixed-wire end user devices 104. The host 100 comprises an interface (I/F) 142, a session controller 120, a routing entity (e.g., a router or switch) 112, a plurality of application servers 144A, . . . , 144N, a healthcare authentication entity 116, an operating system server 180 and a second interface (I/F) 141. The routing entity 112 interconnects the various components of the host 100. The interface 141 connects the routing entity 112 to the secure healthcare information network 160 via link 123. The interface 142 connects the session controller 120 to the end user devices 104. In a specific embodiment, the interface 142 may comprise a plurality of dedicated Ethernet ports.

Figure 2B:
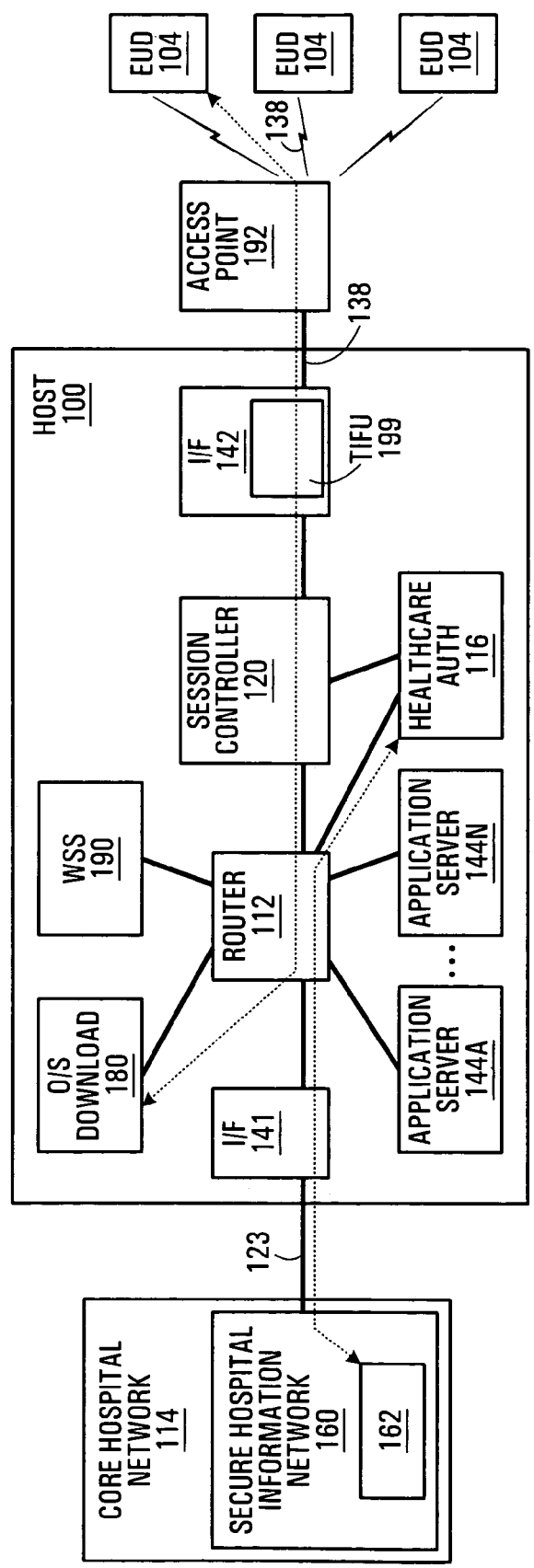

With specific reference to FIG. 2B, there is shown a second variant of the host 100, which is used to communicate over partly fixed-wire, partly wireless links 138 with end user devices 104 that are mobile. In addition to the components described above in the context of the fixed-wire scenario, there are some differences in the scenario of FIG. 2B since the connectivity between individual ports at the interface 142 and the end user devices 104 accessing those ports is no longer static, with both mobility (different terminals attaching to the same port) and roaming (terminals moving between ports) being possible. Specifically, there is provided a network of wireless LAN access points (only one of which is shown at 192) that is connected to the interface 142 over a fixed-wire link and that communicates over a wireless link to one or more end user devices 104. Since the wireless LAN access point 192 can simultaneously service multiple remote terminals, this requires that multiple concurrent but entirely separate sessions to multiple end user devices 104 (operating under different users and authentications) be accommodated on a single port into the interface 142. The leads to the requirement that multiple concurrent and/or overlapping sessions, each with a potentially unique user access policy, be supported on a common port. It is the role of a wireless security switch (WSS) 190 (an available entity associated with the control of WLAN users and security), to meet these requirements by handling the multiple connections to various end user devices, as well as authentication at a device level. In addition, the wireless security switch 190 handles to wide variety of security threats and attacks not encountered in fixed-wire solutions.

Of course, other variants of the above architectures exist and do not limit the scope of the present invention. These include, for example, scenarios where the communication links 138 are fully wireless, or where the end user devices are wireless but not necessarily portable (e.g., computer on wheels—COW), etc.

The application servers 144A, . . . , 144N are responsible for running and executing healthcare applications (such as CPOE services, decision information support tools—DIST, prescription drug order entry services, radiology image viewing services, etc.) and storing temporary medical data (volatile or otherwise) required by those applications under the direction of the authenticated user. One or more of the application servers 144A, . . . , 144N may also be responsible for data gathering from the core hospital network 114, which is achieved by communicating with a topology database (not shown) in the secure healthcare information network 160 via the routing entity 112 and the interface 141 or a specific server in the host 100 equipped with physician request/database mining software. This may require access to the secure healthcare information network 160 and therefore the particular healthcare application may comprise a data mining sub-function which places data requests to the secure healthcare information network 160 and receives the requested data in return.

In a small hospital the application servers 144A, . . . , 144N might be implemented on a single computing device. However, in a larger hospital deployment with perhaps hundreds of terminals, a single computer-based server may be inadequate. In this case, the application servers 144A, . . . , 144N evolve into an application server "complex" with various specialized servers interconnected by a router or switch and with one server providing the master sequencing and data display formatting. The use of a server complex has several advantages. Firstly, multiple application servers can provide some form of protection against failure so that, in the event of a server failure, the system slows down but does not fail, with other servers picking up the traffic load of the failed server. Also, a centralized suite of servers makes application software upgrades much smoother and easier, especially relative to trying to upgrade such software if it were resident in mobile terminals, some of which are guaranteed not to be on-site at the time of upgrade, in addition to the sheer number of machines to upgrade. Additionally, an individual server can be taken out of service for an upgrade or for application suite upgrade without taking the system down, and that upgrade can be exhaustively checked before returning the server to the system.

The end user devices 104 may take many forms based upon the nature of the communications link 138 (fixed-wire in FIG. 2A, WLAN in FIG. 2B, etc.), and whether the end user devices 104 are fixed (e.g. workstations in FIG. 2A) or mobile (e.g. Tablet PC's, PDA's in FIG. 2B). The end user devices 104 may contain their own operating systems in non-volatile storage. Alternatively, parts or all of the operating system and applications (if any) may be downloaded from the operating system server 180 into a volatile memory store on start-up or network attachment. This latter option has various advantages, one of which is that the need for a hard drive or similar non-volatile memory store is eliminated (although those skilled in the art will appreciate that the size of the downloaded operating system or the downloaded portions of the operating system should be kept relatively small in order to make the attachment time reasonable). A second advantage of having all or part of the operating system downloaded from the operating system server 180 into volatile memory is that the end user device 104 will be rendered incapable of operation in the absence of the hospital network after it is detached from the specific hospital network or has been through a detached power-down cycle. This latter reason makes the unit less valuable to a thief and the terminal can truthfully be labeled with "This Terminal Will Not Operate Outside This Hospital".

Of course, to enable the operating system to be downloaded into volatile memory of the end user device 104, the host 100 needs to recognize that such a download is required. Accordingly, the interface 142 provides a terminal identifier functional unit (TIFU) 199, which may be implemented as a processing unit or as an application-specific integrated circuit and whose role it is to recognize the capabilities of the end user device 104 in a variety of ways. These include the possibility of integrating a specific identifier built in to the end user device being attached, which can be interrogated by the TIFU 199 early in the terminal attachment process. For example, the terminal identifier functional unit 199 is operable to recognize whether a particular end user device 104 is of the type that requires the operating system to be downloaded from the operating system server 180 or it may be operable to identify which parts of which operating system will be required to be downloaded to the terminal in order to render it operable, based upon the identifier received from the end user device and on a look-up table map relating the terminal type code to the required download components, this table residing either in the TIFU 199 or in the operating system server 180. Even without any or part of an operating system, the end user device 104 may run boot code from ROM which, on attachment or power-up, notifies the terminal identifier functional unit 199 of its type and basic capabilities so that the correct settings can be made within the operating system server 180.

In some embodiments, all of the operating system from may need to be downloaded from the operating system server 180 into the volatile memory of the end user device 104, whereas in other embodiments, only part of the operating system may need to be downloaded into the volatile memory of the end user device 104. These are examples of a "thin client" architecture, where the end user device functionality is strictly contained, where minimal (or no) autonomous processing occurs in the device so as to render it a dependent entity of the host 100. As has been mentioned, however, the use of the operating system server 180 is not required, as where the operating system is stored in non-volatile memory on the end user devices 104. In such cases (e.g., when the end user device 104 has full workstation capability) the terminal identifier functional unit 199 may still be used, but merely for the purposes of setting up the scope and nature of future session-related data from the application servers 144A, . . . , 144N to the end user device 104.

Thus, if used, the operating system server 180 comprises operating system software for the end user devices 104 in order to allow the end user terminals to contain reduced non-volatile memory resources than standard terminals. The operating system download process is illustrated by the numeral 260 in FIGS. 2A and 2B. Basic non-volatile boot code running on the end user devices 104 connects with the terminal identifier functional unit 199 and then with the download server 180, to cause the appropriate operating system to be downloaded from the operating system server 180 into a volatile memory store on the end user device 104.

A further variation would be to have the operating system server 180 download to the terminal 104 just enough operating system code to allow the end user device 104 to formulate and transmit an initial "authentication request message" to the host 100. Upon authentication (to be described later on), the user of the end user device 104 is known and it is now possible, based on the access profile of the user, to download to the end user device 104 the remainder of the appropriate operating system for that end user device 104 (and for the user associated therewith). This permits customized operating system downloads to the end user device 104, depending on both the operational characteristics of the end user device and the customization preferences of the end user, which is advantageous from the point of view of flexibility.

Other advantages of the multi-stage operating system download are apparent from the following scenario. Consider the case where a clinician, who has been operating a remote portable device that has exhausted its battery charge, places that unit into a charger and picks up a replacement charged unit. At power-up, the boot code in the new end user device 104 causes a negotiation with the TIFU 199 which allows a download of just enough operating system code to formulate and transmit an authentication request message containing the user's authentication primitives. After successful authentication of the user, the operating system server 180 downloads the same operating system and customizations as the old device, which, due to the volatile nature of its operating system store, has reverted to being a generic non-functional unit awaiting a new operating system load.

It is noted that the above advantages apply particularly to the case where the end user device 104 is a mobile device, which allows a hard drive to be dispensed with, hence eliminating a source of power consumption, cost, weight, shortened battery duration and security risk (in case clinical information should be written to that hard drive). Nonetheless, certain advantages can be gained even if the end user device is equipped with a hard drive for storing part of the operating system. To achieve these advantages, the main enablers of the operating system as well as the end user device customizations could be placed into volatile memory and those elements would ideally be constrained to such a size as to allow a rapid download.

In the context of 802.11a WLAN communications, and assuming no more than 25% of the WLAN access point 192 capacity is consumed in the "squirt" of a terminal load, then the maximum load that can be delivered per second would be around 6 Mbps (i.e., 25% of 25 Mbps—which is the maximum actual payload rate of "54 Mb/s" 802.11). This would allow 750 kilobytes worth of operating system or operating system customization files to be delivered per one second. It is noted that, for portable and hand-held devices, these numbers allow very large operating systems and operating system customization files to be downloaded in a relatively short period of time that would be imperceptible to a user accustomed to a ordinary "warm-up times" on the order of 1-5 seconds.

The authentication process, shown by numeral 250 in FIGS. 2A and 2B, is controlled by the session controller 120 in conjunction with the healthcare authentication entity 116. Specifically, the session controller 120, which can be implemented in a non-limiting way as a general purpose computing entity having a routing functionality, is operative to detect an authentication request message (i.e., a request for a new session with a particular one of the healthcare application servers 144A, . . . , 144N) received from one of the end user devices 104. The session controller 120 then performs a high-level validation of the authentication request message. For instance, the session controller 120 may ensure that the proper parts of authentication request message are present and consistent with the expected message structure, and that each part's content is properly structured, but without concern for whether the specific user is a valid or authorized user. The session controller 120 then sends the validated authentication request message to the healthcare authentication entity 116.

Since the session controller 120 only outputs validated authentication request messages to the healthcare authentication entity 116, it may throttle message rates from specific terminals to 116. This frees 116 from having to deal with bogus, poorly formatted or incomplete messages and prevents denial of service attacks from reaching the healthcare authentication entity 116 and hence the healthcare AAA database 162.

The healthcare authentication entity 116 communicates with the healthcare AAA database 162 in the core hospital network 114 via the routing entity 112 in an attempt to authenticate the user. The healthcare authentication entity 116, which can be implemented as a computing entity, performs authentication of healthcare users based on a validated authentication request message received from the end user device 104 via the session controller 120, which, as described above, detects the presence of an authentication request message in the traffic flow from the terminal 104, and then extracts and validates the message format but not its contents. The remainder of the authentication process 250 can then take on one of many forms, including but not limited to the following two examples.

Under a first possibility, on reception of a validly formatted authentication request message from 120, the healthcare authentication entity 116 sends a query containing all the received parameters of the authentication request message to a server in the secure healthcare information network 160 where the healthcare AAA database 162 is contained, in an attempt to allow that server to authenticate the user. The server in the secure healthcare information network 160 extracts, from user credentials carried in the authentication request message, an indication of who the user is claiming to be (i.e., user identity) in addition to proof (i.e., corroborating evidence) that the user is who he or she is claiming to be. The user identity is used to index the healthcare AAA database 162 which contains stored corroborating evidence for each healthcare user. If the stored corroborating evidence stored in the healthcare AAA database 162 corresponding to the user identity matches the corroborating evidence in the authentication request message, then the authentication is said to have been successful. The server in the secure healthcare information network 160 provides the healthcare authentication entity 116 with an indication that the authentication process 250 has been successful in addition to an "access profile" which indicates, e.g., the permissions given to the user with respect to the application servers 144A, . . . , 144N and/or the set of resources in the secure healthcare information network 160. The use of an access profile permits control of the healthcare information and resources being made accessible to different healthcare users. For example, the access profile for a healthcare user who is a clinician or nurse may list the patients forming his or her case load, together with selective permissions for accessing specific levels or areas of information regarding those patients, dependent upon the user's authentication credentials and actual task assignments.

Under a second possibility, the healthcare authentication entity 116 itself extracts the user identity and the corroborating evidence from the user credentials in the authentication request message. The user identity is supplied to the healthcare AAA database 162 in the secure healthcare information network 160, which returns stored corroborating evidence corresponding to the user identity, as well as the access profile associated with the user. The healthcare authentication entity 116 then compares the returned corroborating evidence with the corroborating evidence extracted from the user credentials carried in the authentication request message. If there is a match, then the authentication process 250 is said to have been successful. These two variants described above result in different partitions of workload and therefore one approach may be preferred over the other, depending on operational requirements. Those skilled in the art will be familiar with yet other variants of the authentication process 250 that are within the scope of the invention.

Upon successful authentication, the session controller 120 establishes a communication channel between the end user device 104 and the chosen one of the healthcare application servers 144A, . . . , 144N, allowing the chosen healthcare application server to open a healthcare "session" with the user. At this point, the healthcare application servers 144A, . . . , 144N begin configuring data for the end user device 104, at a level dependent upon the needs of the end user device 104. These needs may be different for a basic thin client/display emulation terminal than for a fully featured workstation, at the level of display characteristics, screen presentation, graphics, active information, input boxes, etc. The knowledge of the end user device configuration is obtained during the initial procedure 260 described above, whereby the terminal identifier functional unit 199 learns of the terminal characteristics of the end user device 104. A page formatter is an example of an application in the application servers 144A, . . . , 144N that can provide data for the end user device 104 in pages that are pre-formatted for display in the event that the terminal is a wholly dependent thin client or display emulating terminal.

Now, at any time during the session and for a variety of reasons, the session controller 120 may need to instruct the end user device 104 to take action to preserve the confidentiality of sensitive healthcare information stored therein. For example, this may arise in the event of forced or voluntary session termination, or when the authenticated user is detected to have traveled far from the end user device 104 (as determined from a triangulation operation, for example, involving multiple wireless access points 192), or again if no user activity has been detected for a specific duration of time. Depending on the circumstances, the action to be taken by the end user device 104 may range from "mild" (e.g., causing the terminal screen to go blank or taking other reversible steps to put the session temporarily into stasis or reversibly removing various forms of access to the session) to "severe" (e.g., causing a complete and permanent end to that particular authorized session and fully removing components of the session stored in the volatile memory, by erasing the contents of the volatile memory 212). It is expected that various forms of "mild" and "severe" responses will be taken in response to various "at-risk" conditions during a session. For instance, and purely as an illustration, the absence of a clinician input may make the screen blank after 30 seconds. After a further minute of no input a password will be required to unblank the screen. After another five minutes the screen and keyboard will remain locked out unless the authentication primitives are re-entered. After 20 minutes or after the entry of a different authentication primitive the session is erased. Note that the data is held secure from view by anyone except the authenticated person after the first 30 seconds, but that the authenticated clinician can retrieve and continue the session at any time up to 20 minutes after the last input. Furthermore, optionally the session can be archived for retrieval by the clinician in a central location within the host 100. More details regarding the actions taken by the end user device 104 will be provided following a description of various embodiments of the end user device 104 with reference to FIGS. 3, 4, 5 and 6.

Figure 3:
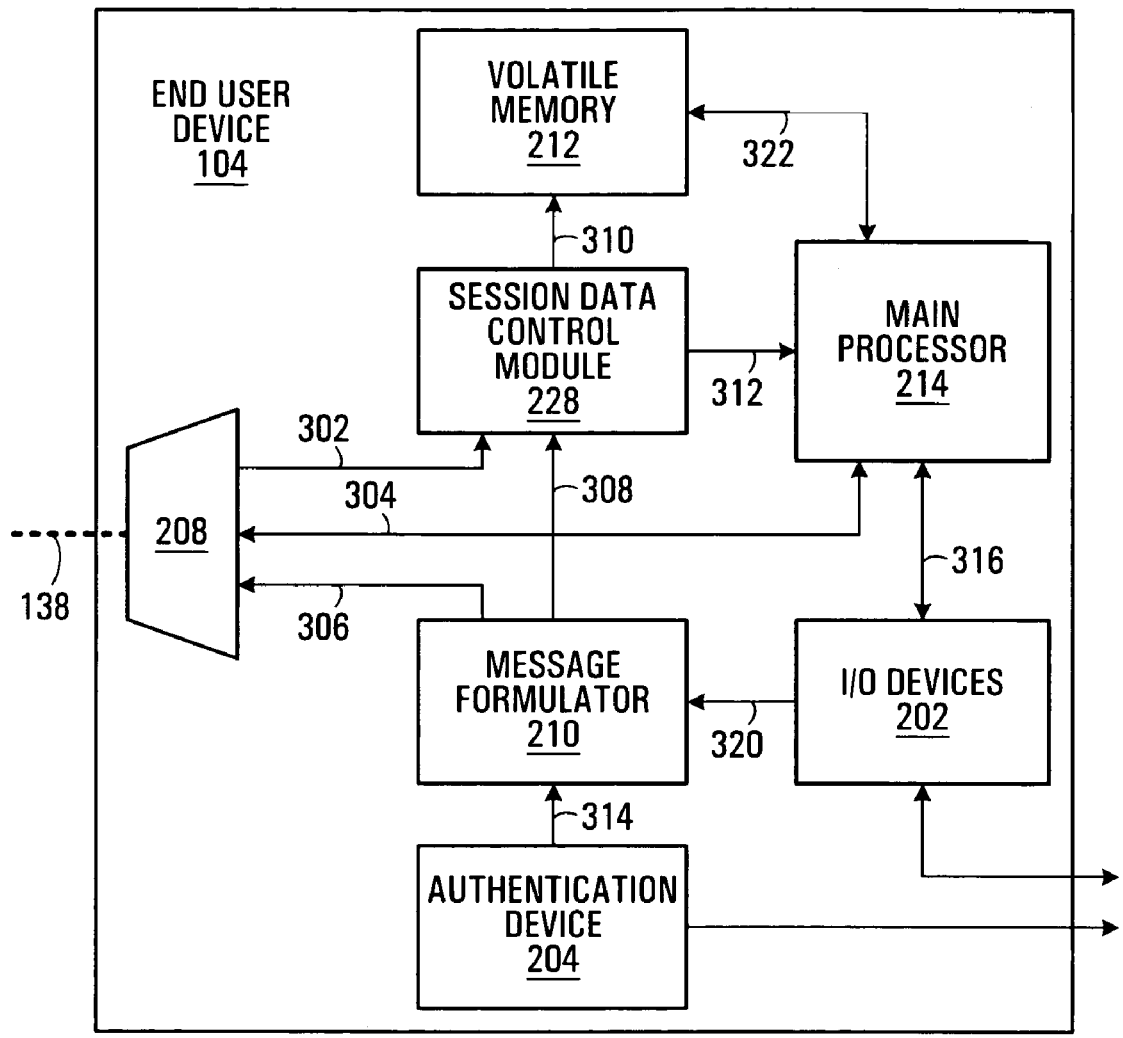
FIGS. 3-6 are block diagrams of an end user device in accordance with embodiments of the present invention.

With reference first to FIG. 3, the end user device 104 comprises a network interface 208, a main processor 214, a message formulator 210, a set of I/O devices 202, an authentication device 204, a volatile memory store (e.g., RAM) 212 and a session data control module 228. Other embodiments including a non-volatile memory store, an encryption module and an RF-ID reader will be described later with specific reference to FIGS. 4, 5 and 6, respectively. For the purposes of this description, and by way of example only, the end user device 104 could be a fixed-wire device or a mobile wireless device.

The network interface 208 is connected to the main processor 214 via a link 304, to the session data control module 228 via a link 302 and to the message formulator 210 via a link 306. The network interface 208 may comprise a multiplexer. In a downstream direction (host 100 to end user device 104), the network interface 208 recognizes messages destined for the main processor 214 as well as messages destined for the session data control module 228. The network interface 208 has the capability to discern the various types of messages and route them to the proper functional element via link 302 or 304, as appropriate. In the upstream direction (end user device 104 to host 100), the network interface 208 receives messages destined for the host 100 as received from the message formulator 210 via link 306 and from the main processor 214 via link 304. The network interface 208 has the capability to combine these messages and transmit them to the host 100 along the communications link 138. In a specific embodiment, the network interface 208 does not have the capability to connect outgoing messages on link 304 from the processor onto link 302, the line to the session data control module 228, which is required only to be accessible to/from the host 100, in order to ensure control security, should the main processor 214 become contaminated with illicit software code by means-unknown. Furthermore, formatted messages generated in the message formulator 210 are only visible to the host 100 and it is required that the network interface 208 be incapable of making these messages visible on link 304 back into the main processor 214, preventing the main processor 214 and its memory (some of which may be non-volatile) from reading and storing these messages, which would be a security leak if authentication request messages could be recovered by the physical theft of the terminal or from spyware downloaded into the end user device 104 by means/people unknown.

The authentication device 204 may include one or more of, for example, a magnetic card reader, a bar code scanner (e.g., for reading a user's bracelet), a biometric (e.g., fingerprint, iris) scanner, etc., the operation of which may or may not be augmented by a password or PIN. The authentication device 204 receives authentication primitives input by the user. The authentication device 204 supplies these authentication primitives to the message formulator 210 via a link 314.

The I/O devices 202 may include, for example, a keyboard/mouse arrangement with a display having a built-in touch screen. The I/O devices 202 receive input (e.g., physician order entries and responses, etc.) which is provided to the main processor 214 via a link 316 for transmission to the host 100 via the network interface 208. The I/O devices 202 also receive data from the main processor 214 via the link 316 which is to be output to the user (e.g., in the form of an image or sound). The I/O devices 202 may also receive some of the authentication primitives (e.g., user name and password or PIN) input by the user. If this is the case, the I/O devices 202 provide these authentication primitives to the message formulator 210 via a link 320.

The message formulator 210 is responsible for formulating authentication request messages based on the authentication primitives received from the authentication device 204 (via link 314) and possibly the I/O devices 202 (via link 320). The message formulator 210 is operable to send the generated authentication request messages to network interface 208 via link 306. The message formulator 210 is also operable to detect when the user has requested to terminate or suspend the current session, either explicitly by an end-of-session command or series of commands interpreted from the keyboard inputs or from the withdrawal of an enabling element, such as an authentication device 204, or implicitly by specifying a new set of authentication primitives. Such a message indicative of session termination or suspension is sent via link 308 to the session data control module 228, which will take appropriate action as described herein below.

The volatile memory store 212 stores data required for the main processor 214 to run a session with one of the application servers 144A, . . . , 144N, for a particular user of the end user device 104. This data may include a downloaded operating system, I/O drivers and software for human-machine interface (HMI), display formatting and data collection. In addition, the data to be stored in the volatile memory store 212 includes sensitive healthcare information (e.g., clinical data), which may be delivered in pages formatted in the host 100 for display via one of the I/O devices 202, analogous to web pages. The portions of the data corresponding to sensitive healthcare information may be stored in a predetermined portion of the volatile memory store 212. The data being written to and read from the volatile memory store 212 by the main processor 214 is carried along a link 322. The volatile memory store 212 is connected to the session data control module 228 by a link 310 having the potential to carry a signal which at times causes the volatile memory store 212 to render the sensitive healthcare information inaccessible to the user of the end user device 104. This result can be achieved in a variety of ways, including erasing, scrambling or resetting a section of the memory, etc.

The main processor 214 manages the processing load presented by the operating system, and runs local applications which are primarily associated with data collection, formatting and display. For example, the main processor 214 may implement a web browser for receiving user input from the I/O devices 202 via link 316, displaying still images and interacting with the user via input boxes for applications which have been centralized in the host 100. The main processor 214 may also implement an MPEG decoder or media player for display of video images, and a voice codec for audio input/output. The main processor 214 accesses the volatile memory store 212 via link 322. In addition, the main processor 214 is connected to the session data control module 228 by a link 312 having the potential to carry messages from the session data control module 228 instructing the main processor 214 to enable/disable the screen display, keyboard input functions and other I/O devices 202.

The session data control module 228 is connected to the message formulator 210 via link 308, to the network interface 208 via link 302, to the terminal processor 314 via link 312 and to the volatile memory store 212 via link 310. In some embodiments, it may be advantageous to implement the session data control module 228 as a hardware or software module external to the main processor 214, allowing a separate messaging channel to be maintained between the session controller 120 and the session data control module 228 via the network interface 208. Such an implementation prevents the session data control module 228 from being influenced or corrupted by nefarious code arriving at the main processor 214 and also this overcomes some start-up sequencing issues, especially with the multi-stage operating system download described earlier. Moreover, actions can be taken to preserve the confidentiality of sensitive healthcare information, irrespective of the state of the main processor 214. Still, it is within the scope of the invention to implement the session data control module 228 as a hardware or software module internal to the main processor 214.

The session data control module 228 receives stimuli from the host 100 (via the network interface 208 and link 302) and from the user (via the message formulator 210 and link 308). Examples of stimuli received from the host 100 via the network interface 208 and link 302 include but are not limited to "pilot" messages which indicate that a session is ongoing and not yet terminated, as well as messages that require the session data control module 228 to preserve confidentiality of the sensitive healthcare information. Such messages may be session termination messages, or messages indicating that the user has been detected to be a certain distance away from the end user device 104 (as determined from a triangulation operation, for example, involving multiple wireless access points 192). Examples of stimuli received from the user via the message formulator 210 via link 308 include messages indicative of a user request to terminate the current session (either explicitly or implicitly by specifying a new set of authentication primitives) or to suspend the current session.

The purpose of the session data control module 228 is to apply a policy (either preconfigured or securely downloaded from the host 100) in order to assemble the stimuli received from various sources with a view to determining whether action needs to be taken to preserve the confidentiality of the sensitive healthcare information stored in the volatile memory store 212. The actions taken by the session data control module 228 can range from severe (e.g., irreversible, which is useful when a session is terminated or a connection is lost) to mild (e.g., reversible, which is useful when a session is temporarily interrupted or suspended).

Figure 7:
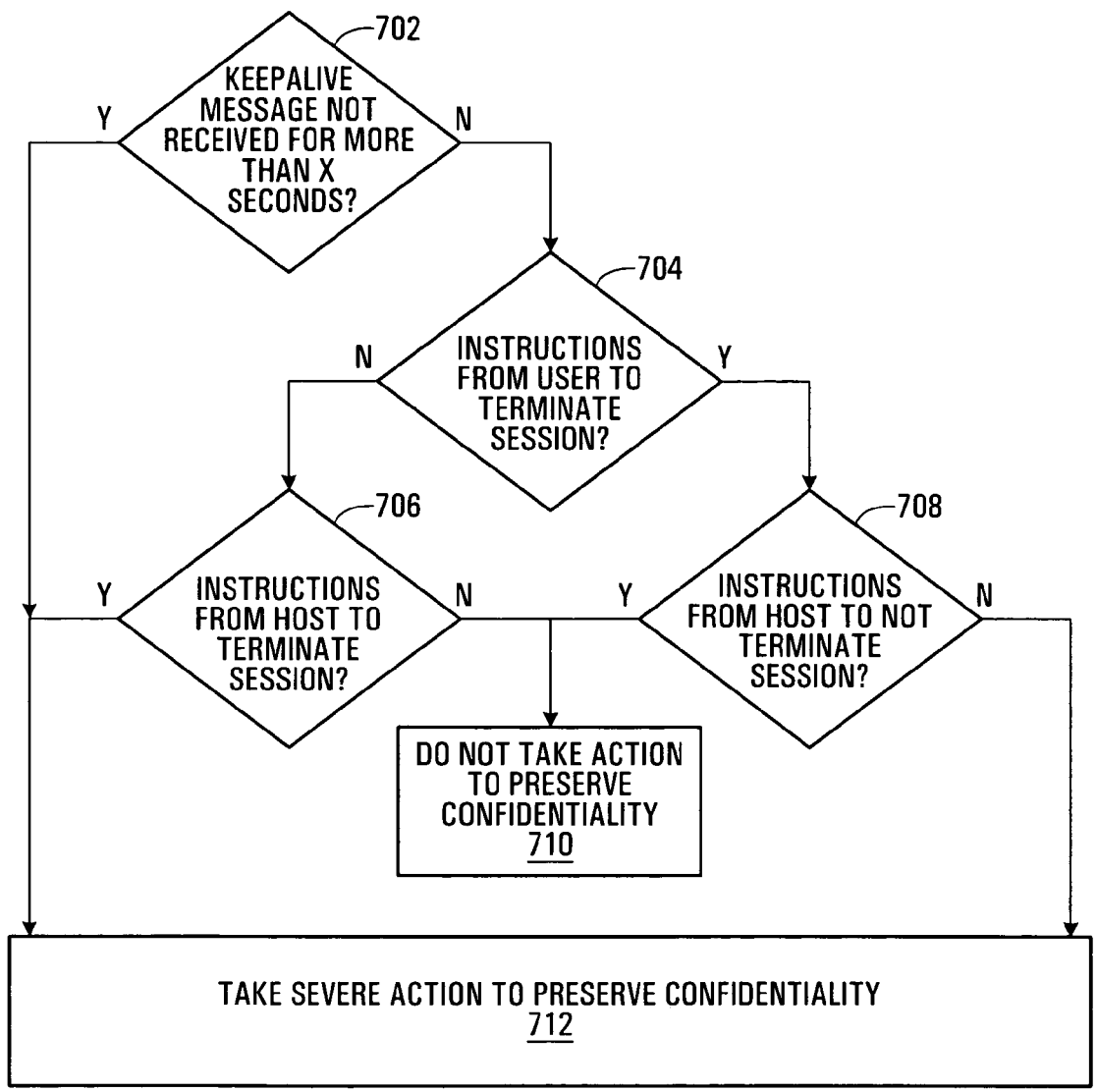
FIGS. 7 and 8 show policies applied in order to determine whether there is a requirement to preserve confidentiality of sensitive healthcare information stored in the end user device.

FIG. 7 shows an example of a policy resulting in "severe" action to preserve confidentiality of sensitive healthcare information stored in the volatile memory 212. Specifically, such action is taken if any of the following conditions is met: either a pilot message has not been received for a predetermined amount of time (box 702, which represents loss of a connection with the host 100), or there are instructions received from the user to terminate the session (box 704) without contrary instructions from the host 100 (box 708), or there are instructions from the host 100 to terminate the session (box 706), regardless of there being no instructions from the user to terminate of the session. Each of these circumstances leads to box 712, which represents the determination that severe action is required to preserve confidentiality. If, on the other hand, none of the above conditions is reached, then box 710 applies, i.e., no specific action is taken as regards preservation of confidentiality of the sensitive healthcare information stored in the volatile memory store 212.

Examples of severe action to preserve confidentiality of sensitive healthcare information stored in the volatile memory 212 include the session data control module 228 sending a signal to the volatile memory store 212 via link 310, to which the volatile memory store 212 responds by deleting or writing over the portion of memory containing the sensitive healthcare information.

Figure 8:
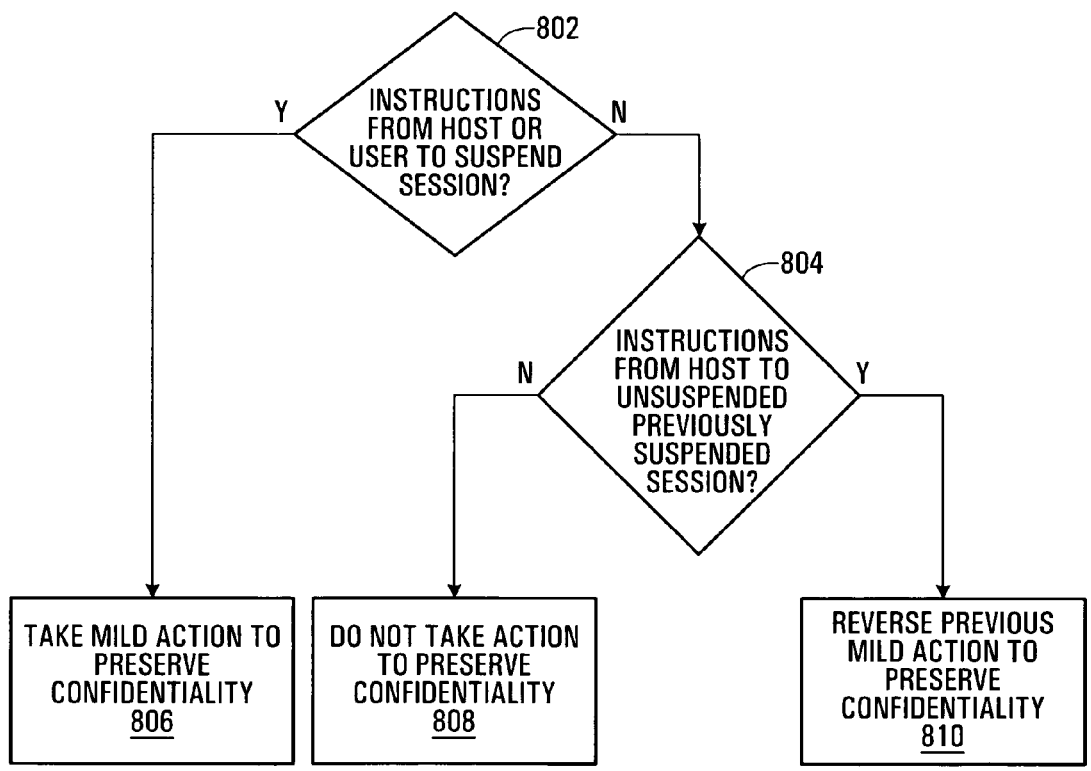

FIG. 8 shows an example of a policy resulting in "mild" action to preserve confidentiality of sensitive healthcare information stored in the volatile memory 212. Specifically, if instructions to suspend the session are received from the host 100 or the user (box 802), then mild action is taken (box 806). As mentioned above, the mild action is reversible and this is illustrated by box 804, which represents receipt of instructions from the host 100 to unsuspend the previously suspended session, resulting in reversing the mild action at box 810. If, on the other hand, none of the above conditions is satisfied, then box 808 applies, i.e., no specific action is taken as regards preservation of confidentiality of the sensitive healthcare information stored in the volatile memory store 212. It is noted that in order to reverse, at box 810, the mild action taken at box 806, it may be useful to require that such instructions be received from the host 100 and not the user, as it would prevent hacking on the part of the user.

Examples of mild action to preserve confidentiality of sensitive healthcare information stored in the volatile memory store 212 include the session data control module 228 sending a message to the main processor 214 via link 312 instructing it to disable the screen display, keyboard input functions or other I/O devices 202, without necessarily affecting the contents of the volatile memory store 212. This is useful in circumstances where the user has temporarily stepped away from the end user device and may soon thereafter wish to re-access the contents of the volatile memory store 212. In order to reverse the mild action taken in box 806, the session data control module 228 sends a similar message to the main processor 214 via link 312, instructing it to enable the affected I/O devices 202.

Still more complex policies can be applied, in which mild action to preserve confidentiality of the sensitive healthcare information could be followed by severe action if a given condition is satisfied. For example, if a certain amount of time elapses following the mild action, then the severe action could be taken. In another example, if the distance between the user and the end user device (which can be determined by triangulation, for example) exceeds a first threshold, then the mild action could be taken and if the distance exceeds a second threshold, then the severe action could be taken. Or severe action could be taken if the distance between the user and the end user device continuously exceeds a predetermined threshold for a predetermined amount of time.

Figure 4:
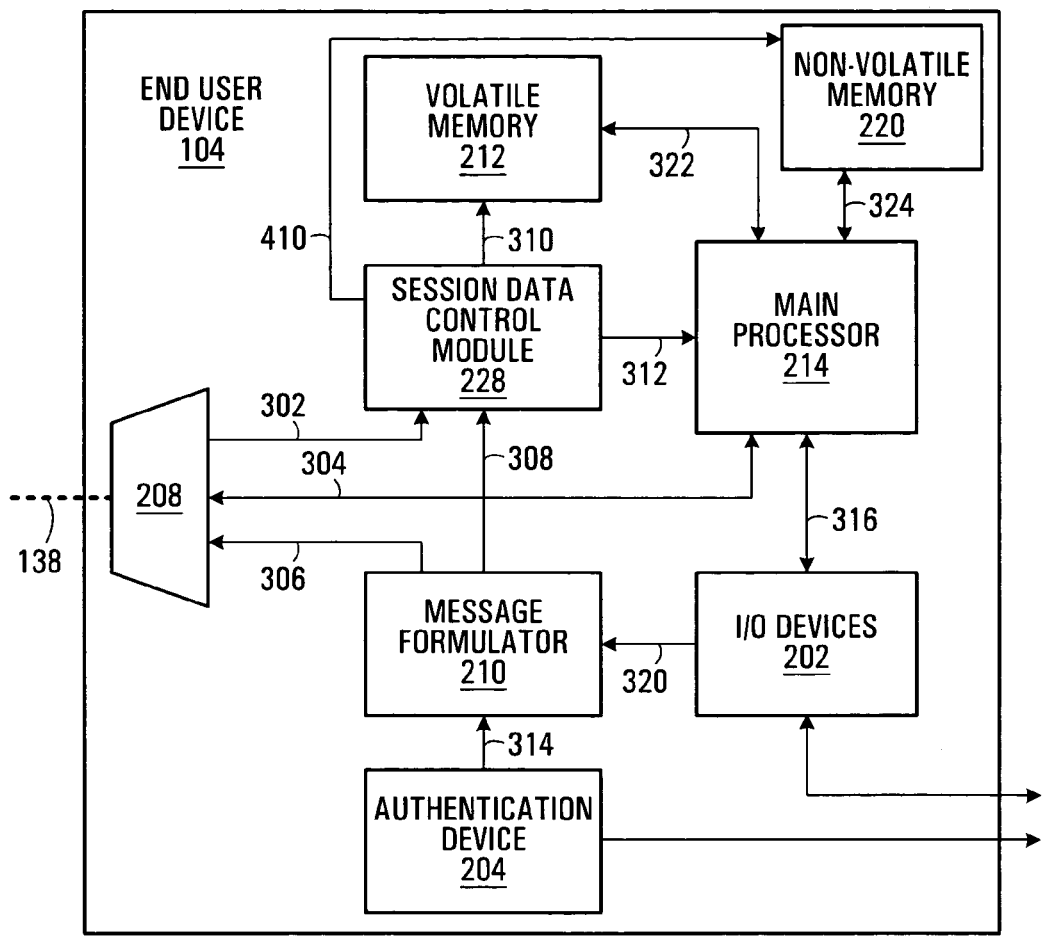

A first variant of the end user device 104 of FIG. 3 is shown in FIG. 4, where there is provided a non-volatile memory store 220 (such as a hard drive) in addition to the volatile memory store 212. The use of the hard drive 220 to store sensitive healthcare information may not always be recommended, since power-off of the end user device does nothing to affect availability of the data. Nonetheless, when a hard drive 220 is used, it may be desirable to employ a mechanism such as that described above in order to preserve the confidentiality of sensitive healthcare information stored thereon.

The hard disk 220 may assume some of the functionality of the previously described volatile memory store 212 and thus may be used to store data required for the main processor 214 to run a session with one of the application servers 144A, ..., 144N, for a particular user of the end user device 104. This data may include a downloaded operating system, I/O drivers and software for human-machine interface (HMI), display formatting and data collection. The hard disk 220 may also store a clinical application processes sensitive healthcare information (e.g., clinical data). The sensitive healthcare information may be stored in a predetermined portion of the hard drive 220. The data being written to and read from the hard drive by the main processor 214 is carried along a link 324. The hard drive 220 is connected to the session data control module 228 by a link 410 which at times carries a signal that causes the hard drive 220 to render the sensitive healthcare information inaccessible to the user of the end user device 104. This result can be achieved in a variety of ways, including erasing, scrambling or resetting a section of the hard drive 220, etc.

Basically the same functional description as the one above applies in respect of taking action to preserve confidentiality of sensitive healthcare information, with the additional feature that the part of the hard drive 220 comprising sensitive healthcare data is to be erased or otherwise rendered inaccessible to the user of the end user device 104. Specifically, with reference to FIG. 7, if application of the policy leads to box 712, representing the determination that severe action is required to preserve confidentiality, the session data control module 228 may, in addition to (or instead of) the signal sent to the volatile memory store 212 along link 310, send a signal to the hard drive 220 via link 410, to which the hard drive 220 responds in the manner described in the previous paragraph. In another embodiment, with reference to FIG. 8, if application of the policy leads to box 806, representing the determination that mild action is required to preserve confidentiality, the session data control module 228 may send a message to the main processor 214 instructing it to disable the screen display, keyboard input functions or other I/O devices 202. Again, a combination of these and other policies is also possible.

Figure 5:
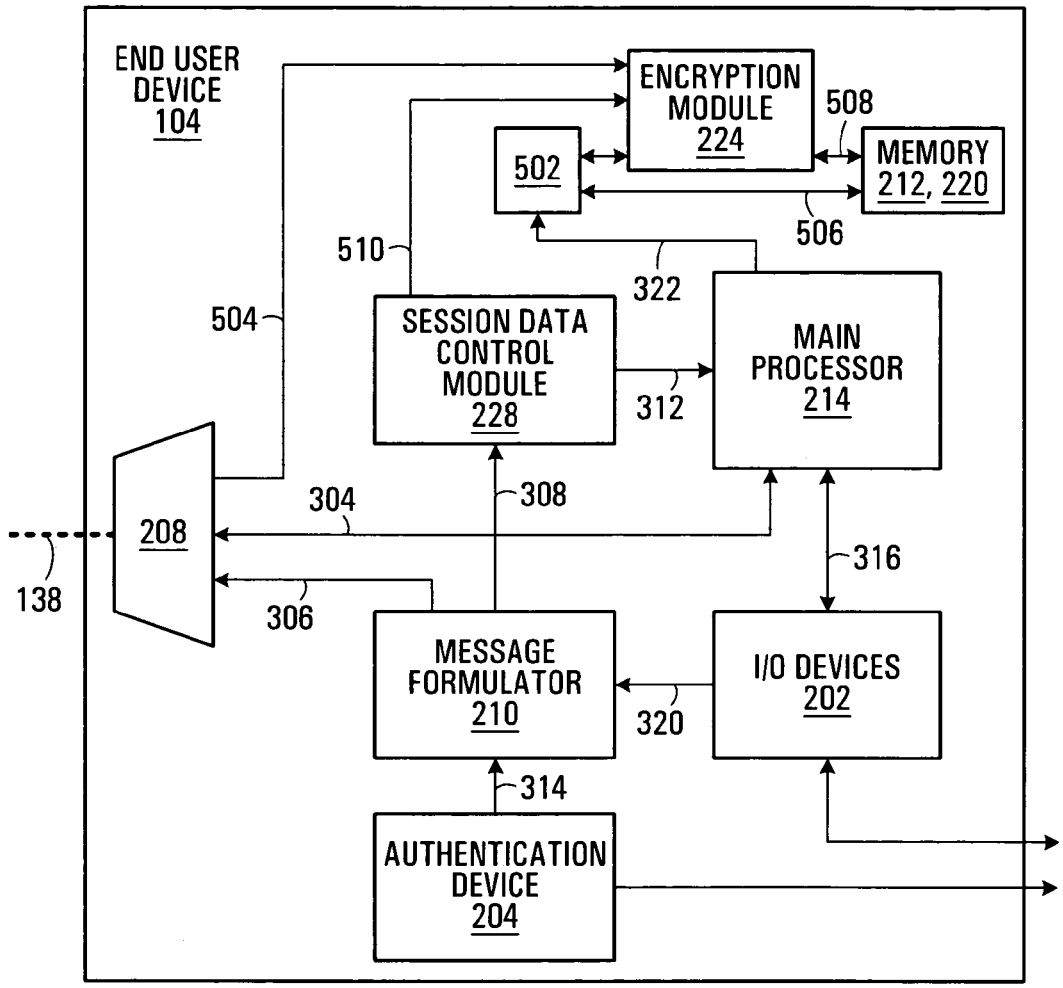

A second variant of the end user device 104 of FIG. 3 is shown in FIG. 5, where there is provided additional security against tampering with sensitive healthcare information stored in the volatile memory store 212 and/or the hard drive 220 (collectively "the memory 212, 220"). Specifically, the end user device 104 comprises an encryption module 224 connected to the memory 212, 220 via a data bus 508. The encryption module 224 uses an encryption key to encrypt data intended to be written to the memory 212, 220. The encryption key is supplied by the host 504 via a separate channel 504 established by the network interface 208. The encryption key may be kept in a volatile or non-volatile memory store within the encryption module 224. A decryption key, which may be the same as or different from the encryption key, is used by the encryption module 224 to decrypt data read from the memory 212, 220.

In order to write sensitive healthcare information into the memory 212, 220, the main processor 214 releases a write command towards the memory 212, 220. The write command may pass through the encryption module 224 and thus may be provided along link 322. The write command is accompanied by sensitive healthcare information which is provided to the encryption module 224 along link 322. The sensitive healthcare information is encrypted, using the encryption key, by the encryption module 224. An encrypted version of the sensitive healthcare information is thus written to the memory 212, 220 along the data bus 508.

In order to read sensitive healthcare information from the memory 212, 220, the main processor 214 releases a read command towards the memory 212, 220. The read command may pass through the encryption module 224. The memory 212, 220 responds to the read command by providing an encrypted version of the desired sensitive healthcare information onto the data bus 508. The encrypted information arrives at the encryption module 224, where it is decrypted, using the decryption key, prior to being fed to the main processor 214 along link 322.

Of course, it should be understood that a segment or portion of the memory 212, 220 could be reserved for storing unencrypted data, specifically data in respect of which it is not necessary to preserve confidentiality. In fact, it may be advantageous to limit the amount of data stored in the volatile memory store 212 in an encrypted manner in order to render cracking the encryption/decryption key more difficult and also to reduce the delay with which data is written to/read from the memory 212, 220 by the main processor 214. To this end, the end user terminal is provided with a selection module 502 that is disposed between the main processor 214 and the encryption module 224. The main processor 214 is equipped with the ability to control the operational state of the selection module 502 by means of a control signal, which controllably causes the selection module 502 to exchange unencrypted data either with the encryption module 224 or with the memory 212, 224 via a link 506 that bypasses the encryption module 224.

The gate 502 is operated by the clinical context as-seen by the clinical application, whether resident within the host 100 or the end user device 104. One way this can be done is for all clinical data files to carry a readable field (or word or header component) that denotes the file to be one requiring encryption. This field is read by the switch element in the gate 502 which routes that particular file through to the encryption module 224. On reading stored files, the gate 502 can read both the direct path output and the decrypted path output. If it sees the reconstruction of an "encryption required" header or flag on the decrypted path output, then the gate 502 selects that path and routes the file to the main processor 214 (and/or the processor's volatile cache memory for its working files). Otherwise, the gate 502 selects the non-encrypted path from the volatile memory store 212. Note that the gate 502 does not require knowledge of the encryption or decryption key, and thus its operation does not have to be kept secure (other than to prevent it from being disabled). This is readily accomplished by placing a watchdog on link 506, which watches for the "encryption-required" field (or word or header) message in the data. Detection of this is an indication of a malfunction within the gate 502 which can cause an alarm or the termination of the session, or a memory wipe upon the termination of that particular session or the initiation of "spy-hunter" software to check the validity of the terminal software load as a background task.

Those skilled in the art will appreciate that in some embodiments, the encryption module 224, gate 502 may be implemented on the same application-specific integrated circuit (ASIC) as the main processor 214, which renders the link 322 between the encryption module 224 and the main processor 214 more difficult to intercept than the data bus 508 between the encryption module 224 and the memory 212, 220, as long as the main processor 214 cannot read the downloaded encryption key (i.e. has no access to link 504). Specifically, if a thief intercepts the data bus 508 by means of an electronic equivalent to an "extension cord" (e.g. by coupling into an empty expansion slot for additional memory modules), this will yield information of little value to the thief, as the data so accessed has been encrypted by the encryption key that remains safely stored in the encryption module 224, and which is inaccessible due to its location on the same ASIC as the main processor 214.

In order to preserve the confidentiality of sensitive healthcare information stored in the memory 212, 220, various options are possible in addition to those discussed above in respect of FIGS. 3 and 4. For example, because the sensitive healthcare information stored in the memory 212, 220 is encrypted, it is not necessary to expressly erase its contents in order to render it inaccessible to the user. Rather, the same net effect is achieved by simply changing or resetting the decryption key used by the encryption module 224. To this end, should the session data control module 228 conclude that mild or severe action is required to preserve confidentiality of sensitive healthcare information stored in the memory 212, 220, it can generate a message to the encryption module 224 along link 510, containing a new (or blank) decryption key or containing a command to erase or change the decryption key. The effect will be that subsequent accesses to the memory 212, 220 will be of little value to the end user, the sensitive healthcare information stored therein having effectively been rendered inaccessible. In order to reverse the mild action (step 810 in FIG. 8), the previous version of the decryption key can be restored to the encryption module 224. This of course assumes that the previous version of the decryption key was stored before it was changed.

Figure 6:
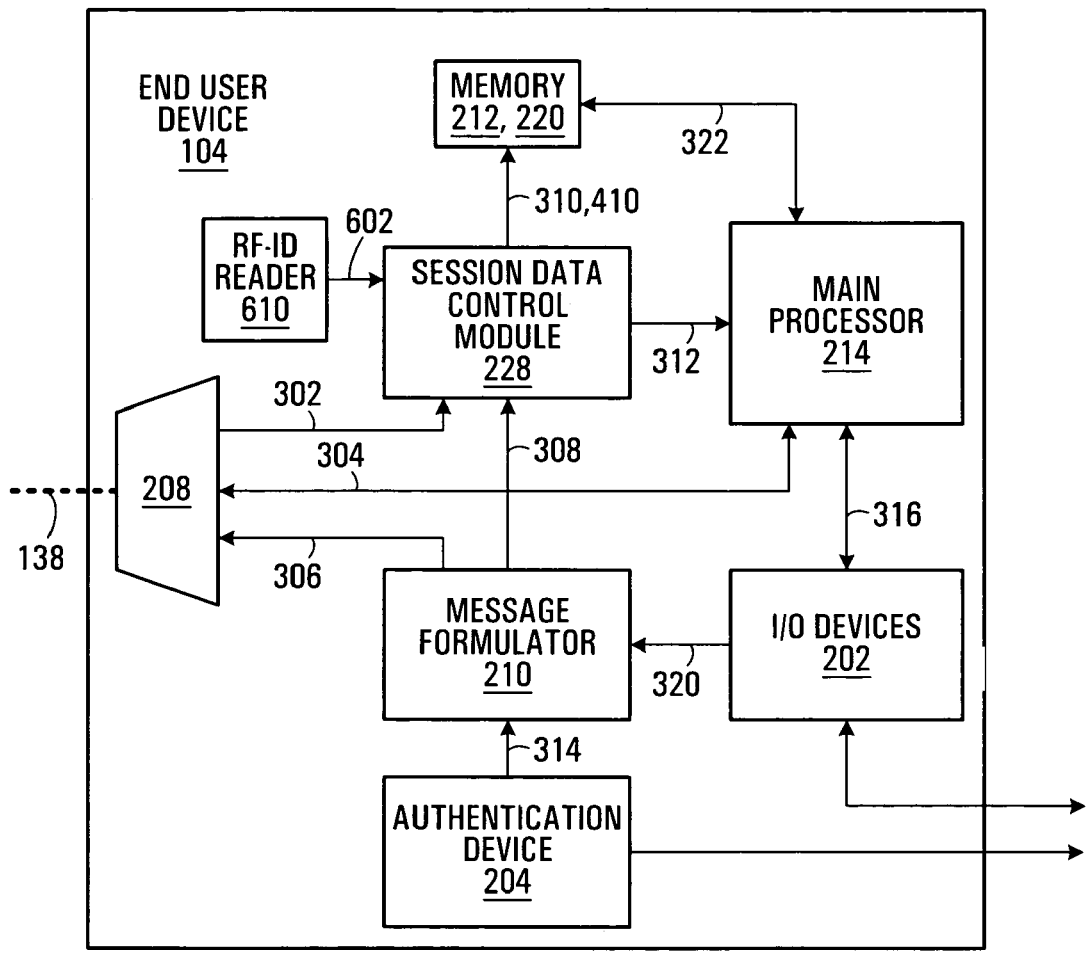

A third variant of the end user device 104 of FIG. 3 is shown in FIG. 6, where there is provided a radio frequency identification (RF-ID) reader 610, which is capable of reading a code on a passive tag worn by a user. The RF-ID reader 610 is connected to the session data control module 228 by a link 602. The degree of match between the code detected by the RF-ID reader 610 and a code obtained from the host 100 can be interpreted as an indication of the distance between the user and the end user device 104. If this distance exceeds a certain threshold (or if the degree of match falls below a certain threshold), then the RF-ID reader 610 generates a message along link 602 in order to inform the session data control module 228 that the user has distanced himself/herself from the end user device 104. Such message may also be generated as a result of a more complex condition, such as when the distance between the user and the end user device 104 continuously exceeds a predetermined threshold for a predetermined amount of time or a running integral of the distance between the user and the end user device 104 over time exceeds a predetermined threshold.

In order to preserve the confidentiality of sensitive healthcare information stored in the memory 212, 220, the receipt of a message along link 602 provides yet another stimulus that needs to be considered by the session data control module 228 when applying its policy to determine whether action needs to be taken to preserve the confidentiality of the sensitive healthcare information stored in the memory 212, 220. In this case, FIG. 7 would be modified to include a step of verifying whether a message was received from the RF-ID reader 610 along link 602. If so, this should be interpreted by the session data control module 228 as there being a requirement to preserve confidentiality of sensitive healthcare information, unless it is in receipt of a pilot message from the host 100 and it has not received instructions to terminate the session. The session data control module 228 then sends a signal to the memory 212, 220, which reacts in the way described above.

Of course, combinations of the above embodiments could be used. For example, the use of the encryption module 224 with the RF-ID reader 610 allows a more complex policy to be applied, in which mild action to preserve confidentiality of the sensitive healthcare information could be followed by severe action if a given condition is satisfied. For example, if the distance between the user and the end user device (which can be determined by the RF-ID reader 610 based on the degree of match between a detected code and the code corresponding to the authenticated user) exceeds a first threshold, then the mild action could be taken and if the distance exceeds a second threshold, then the severe action could be taken without the possibility of reversing the mild action.

While specific embodiments of the present invention have been described and illustrated, it will be apparent to those skilled in the art that numerous modifications and variations can be made without departing from the scope of the invention as defined in the appended claims.

What is claimed is:

1. An end user device for communication with a server, comprising:
   a control entity operative to support a session with the server for an authenticated user;
   a memory store operative to store sensitive information during the session;
   a user interface for interfacing with the authenticated user; and
   a network interface for interfacing with the server;
   the control entity being further operative to (i) apply a policy based on stimuli received via the user interface and the network interface to determine whether confidentiality of the sensitive information stored in the memory store is to be preserved and (ii) responsive to determining that confidentiality of the sensitive information stored in the memory store is to be preserved, take an action to preserve confidentiality of the sensitive information stored in the memory store;
   wherein said stimuli comprise user commands received via the user interface and wherein determining that confidentiality of the sensitive information stored in the memory store is to be preserved comprises detecting a user command to terminate the session;
   wherein said stimuli comprise user commands received via the user interface and wherein determining that confidentiality of the sensitive information stored in the memory store is to be preserved comprises detecting a user command to suspend the session;
   wherein said stimuli comprise user commands received via the user interface and wherein determining that confidentiality of the sensitive information stored in the memory store is to be preserved comprises detecting a user command to authenticate a new user other than the authenticated user;
   wherein said stimuli comprise network commands received via the network interface and wherein determining that confidentiality of the sensitive information stored in the memory store is to be preserved comprises detecting a network command to terminate the session;
   wherein said stimuli comprise network commands received via the network interface and wherein determining that confidentiality of the sensitive information stored in the memory store is to be preserved comprises detecting a network command to suspend the session;
   wherein said stimuli comprise pilot messages received via the network interface and wherein determining that confidentiality of the sensitive information stored in the memory store is to be preserved comprises detecting a prolonged absence of pilot messages received from the network interface.

2. The end user device defined in claim 1, further comprising an RF-ID detector operative to detecting an identification code of a potential user proximate to the end user device, the RF-ID detector further operative to provide a detected identification code to the control entity.

3. The end user device defined in claim 2, the control entity being adapted to effect a comparison of the detected identification code to an identification code associated with the authenticated user.

4. The end user device defined in claim 3, the control entity being adapted to estimate a distance between the authenticated user and the end user device based on the comparison.

5. The end user device defined in claim 4, wherein said stimuli comprise the distance estimated by the control entity and wherein determining that confidentiality of the sensitive information stored in the memory store is to be preserved comprises detecting that said distance exceeds a predetermined threshold.

6. The end user device defined in claim 4, wherein said stimuli comprise the distance estimated by the control entity and wherein determining that confidentiality of the sensitive information stored in the memory store is to be preserved comprises detecting that said distance continuously exceeds a predetermined threshold for a predetermined amount of time.

7. The end user device defined in claim 4, wherein said stimuli comprise the distance estimated by the control entity and wherein determining that confidentiality of the sensitive information stored in the memory store is to be preserved comprises detecting that an integral of said distance over time exceeds a predetermined threshold.

8. The end user device defined in claim 7, the control entity being adapted to receive an indication of a distance between the authenticated user and the end user device.

9. The end user device defined in claim 8, wherein said stimuli comprise said distance and wherein determining that confidentiality of the sensitive information stored in the memory store is to be preserved comprises detecting that said distance exceeds a predetermined threshold.

10. The end user device defined in claim 8, wherein said stimuli comprise the distance and wherein determining that confidentiality of the sensitive information stored in the memory store is to be preserved comprises detecting that said distance continuously exceeds a predetermined threshold for a predetermined amount of time.

11. The end user device defined in claim 8, wherein said stimuli comprise the distance and wherein determining that confidentiality of the sensitive information stored in the memory store is to be preserved comprises detecting that an integral of said distance over time exceeds a predetermined threshold.

12. The end user device defined in claim 1, wherein the control entity being operative to take an action to preserve confidentiality of the sensitive information stored in the memory store comprises rendering the sensitive information stored in the memory store inaccessible to potential users of the end user device other than the authenticated user.

13. The end user device defined in claim 1, wherein the control entity being operative to take an action to preserve confidentiality of the sensitive information stored in the memory store comprises erasing the sensitive information from the memory store.

14. The end user device defined in claim 1, wherein the control entity being operative to take an action to preserve confidentiality of the sensitive information stored in the memory store comprises scrambling the sensitive information in the memory store.

15. The end user device defined in claim 1, wherein the control entity being operative to take an action to preserve confidentiality of the sensitive information stored in the memory store comprises disabling the user interface.

16. The end user device defined in claim 1, further comprising a data bus connected to the memory store, the data bus being adapted for transporting data to and from the memory store;

an encryption module communicatively coupled to the control entity and to the data bus;

the control entity being further operative to release read and write commands towards the memory store, the write command being accompanied by first data intended to be written to the memory store;

upon the control entity releasing a write command accompanied by said first data, the encryption module being operative to encrypt, in accordance with an encryption key, said first data and send an encrypted version of said first data onto the data bus for writing into the memory store;

upon the control entity releasing a read command, the encryption module being operative to decrypt, in accordance with a decryption key, an encrypted version of second data received from the memory store via the data bus and provide said second data to the control entity.

17. The end user device defined in claim 16, wherein the control entity being operative to take an action to preserve confidentiality of the sensitive information stored in the memory store comprises changing the decryption key.

18. The end user device defined in claim 16, wherein the control entity being operative to take an action to preserve confidentiality of the sensitive information stored in the memory store comprises deleting the decryption key.

19. The end user device defined in claim 16, wherein the control entity being operative to take an action to preserve confidentiality of the sensitive information stored in the memory store comprises causing the encryption module to use a new decryption key different from the previous decryption key.

20. The end user device defined in claim 19, wherein the control entity being operative to take an action to preserve confidentiality of the sensitive information stored in the memory store further comprises storing the previous decryption key prior to causing the encryption module to use the new decryption key.

21. The end user device defined in claim 20, the control entity further operative to (iii) determine whether confidentiality of the sensitive information stored in the memory store no longer needs to be preserved and (iv) responsive to determining that confidentiality of the sensitive information stored in the memory store no longer needs to be preserved, cause the encryption module to use said previous decryption key.

22. The end user device defined in claim 1, the control entity being further operative to (iii) determine whether confidentiality of the sensitive information stored in the memory store no longer needs to be preserved and (iv) responsive to determining that confidentiality of the sensitive information stored in the memory store no longer needs to be preserved, take an action to reverse the action previously taken to preserve confidentiality of the sensitive information stored in the memory store.

23. The end user device defined in claim 22, wherein the control entity being operative to determine whether confidentiality of the sensitive information stored in the memory store no longer needs to be preserved comprises the control entity being operative to apply a policy based on stimuli received via the user interface and the network interface.

24. The end user device defined in claim 23, wherein said stimuli comprise user commands received via the user interface arid wherein determining that confidentiality of the sensitive information stored in the memory store no longer needs to be preserved comprises detecting a host command to unsuspend a suspended session.

25. The end user device defined in claim 1 being a mobile wireless device.

26. The end user defined in claim 1, further comprising a label indicative of an inability to function outside a predetermined location.

27. A method, comprising:
   establishing a healthcare session with an end user device servicing an authenticated user;
   providing sensitive healthcare information to the end user device for storage thereon during the healthcare session;
   detecting existence of a requirement to preserve confidentiality of the sensitive healthcare information; and
   responsive to the detecting, sending a message to the end user device for causing the end user device to preserve the confidentiality of the sensitive healthcare information;
wherein detecting existence of a requirement to preserve confidentiality of the sensitive healthcare information comprises detecting a distance between the authenticated user and the end user device and determining that the distance exceeds a predetermined threshold.

28. A method, comprising:
   establishing a healthcare session with an end user device servicing an authenticated user;
   providing sensitive healthcare information to the end user device for storage thereon during the healthcare session;
   detecting existence of a requirement to preserve confidentiality of the sensitive healthcare information; and
   responsive to the detecting, sending a message to the end user device for causing the end user device to preserve the confidentiality of the sensitive healthcare information;
wherein detecting existence of a requirement to preserve confidentiality of the sensitive healthcare information comprises detecting a distance between the authenticated user and the end user device and determining that the distance continuously exceeds a predetermined threshold for a predetermined period of time.

29. A method, comprising:
   establishing a healthcare session with an end user device servicing an authenticated user;
   providing sensitive healthcare information to the end user device for storage thereon during the healthcare session;
   detecting existence of a requirement to preserve confidentiality of the sensitive healthcare information; and
   responsive to the detecting, sending a message to the end user device for causing the end user device to preserve the confidentiality of the sensitive healthcare information;
wherein detecting existence of a requirement to preserve confidentiality of the sensitive healthcare information comprises detecting a distance between the authenticated user and the end user device and determining that an integral of the distance over time exceeds a predetermined threshold.

* * * * *

UNITED STATES PATENT AND TRADEMARK OFFICE
CERTIFICATE OF CORRECTION

PATENT NO.        : 7,430,671 B2
APPLICATION NO.   : 10/813358
DATED             : September 30, 2008
INVENTOR(S)       : Alan Frank Graves et al.

It is certified that error appears in the above-identified patent and that said Letters Patent is hereby corrected as shown below:

Col. 20 claim 24, line 3 should read "<u>and</u> wherein", not "arid wherein"

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,430,671 B2
APPLICATION NO. : 10/813358
DATED : September 30, 2008
INVENTOR(S) : Alan Frank Graves et al.

Page 1 of 1

It is certified that error appears in the above-identified patent and that said Letters Patent is hereby corrected as shown below:

Col. 20 claim 24, line 62 should read "and wherein", not "arid wherein"

This certificate supersedes the Certificate of Correction issued February 24, 2009.

Signed and Sealed this

Seventeenth Day of March, 2009

JOHN DOLL
*Acting Director of the United States Patent and Trademark Office*